United States Patent [19]

Weissbrich et al.

[11] Patent Number: 5,238,447

[45] Date of Patent: Aug. 24, 1993

[54] PROCESS FOR COOLING A MOTOR VEHICLE INTERIOR AND A VEHICLE ROOF SYSTEM FOR THE PERFORMANCE THEREOF

[75] Inventors: Alfons Weissbrich, Gauting; Ferdinand Hahn, Ebenhausen, both of Fed. Rep. of Germany

[73] Assignee: Webasto Karosseriesysteme GmbH, Stockdorf, Fed. Rep. of Germany

[21] Appl. No.: 943,529

[22] Filed: Sep. 11, 1992

[30] Foreign Application Priority Data

Sep. 12, 1991 [DE] Fed. Rep. of Germany ....... 4130360

[51] Int. Cl.⁵ ............................................. B60H 1/26
[52] U.S. Cl. ..................................... 454/75; 236/49.3
[58] Field of Search ................. 236/49.3; 454/75, 129, 454/136, 141, 143, 900

[56] References Cited

U.S. PATENT DOCUMENTS

| 4,436,064 | 3/1984 | Lamkewitz et al. ........ 123/142.5 R |
| 4,852,469 | 8/1989 | Chuang ............................... 454/75 |

FOREIGN PATENT DOCUMENTS

| 2817297 | 10/1979 | Fed. Rep. of Germany . |
| 3924755 | 1/1991 | Fed. Rep. of Germany . |
| 41204 | 3/1982 | Japan ............................ 454/75 |
| 207719 | 8/1988 | Japan ........................... 454/900 |

*Primary Examiner*—Harold Joyce
*Attorney, Agent, or Firm*—Sixbey, Friedman, Leedom & Ferguson

[57] ABSTRACT

A process for cooling the interior of a motor vehicle and a roof system for its performance which has a roof part that can be opened by an electric motor. As a function of the interior temperature and an interior setpoint temperature, an automatic moving of the roof part that can be opened into a first open position takes place, in which a large roof opening is created. Time-dependent or as an alternative to this, when the temperature is less than a lower threshold temperature, an automatic moving of the roof part that can be opened into a second open position takes place, in which a smaller roof opening is created. The process and roof system enable quick removal of a build-up of heat when getting in the vehicle and in the beginning phase of a drive.

23 Claims, 2 Drawing Sheets

2

PROCESS FOR COOLING A MOTOR VEHICLE INTERIOR AND A VEHICLE ROOF SYSTEM FOR THE PERFORMANCE THEREOF

BACKGROUND OF THE INVENTION

The invention relates to a process for cooling an interior of a motor vehicle with a roof part that can be opened, and which is movable by an electric motor into at least two positions opening a roof opening to varying degrees.

Known sliding-lifting roofs or power roofs operated by an electric motor are used by the driver, i.a., for the purpose of drawing off from the motor vehicle a build-up of heat present in the motor vehicle interior at the beginning of a drive, which forms especially with intensive solar radiation. For this purpose, it is necessary that the driver, after getting in the vehicle, operates a corresponding control switch of the roof part that can be opened, and if he wants to support the ventilation action by a ventilator, this also is put into action. If, after a roof, having been opened, to a large extent at the beginning of the drive to release a considerable heat build-up in the interior, it becomes apparent, as the drive continues, especially at higher driving speeds, that draft phenomena occur, especially in the head area of the driver, and undesirable noises develop in the motor vehicle interior, the driver must operate the control switch to change the position of the roof part that can be opened to counteract the above-named phenomena. All such control actions reduce the driver's concentration on the traffic situation.

SUMMARY OF THE INVENTION

The object of the invention is to describe a generic process by which the above-described drawbacks are prevented.

This object is achieved according to the invention by controlling movement of the openable roof part so that it is automatically moved to a first of at least two positions in which a roof opening is at least partially opened when an initial vehicle interior temperature detected by a temperature sensor exceeds a preset interior temperature, and is subsequently automatically moved to a second of said at least two positions, in which the roof opening is opened to a lesser extent, on the basis of the expiration of a preset time period, or as an alternative, when the vehicle interior drops below a lower temperature limit valve, which may be calculated as a function of the preset interior temperature.

To start with, a quick removal of the heat build-up takes place by the large roof opening, and after a preset period of time or the temperature dropping below a lower threshold temperature, the roof part is moved into a second position, in which the roof opening is opened to a lesser extent by which no disturbances, by drafts or noises, occurs. The entire process takes place fully automatically and requires no control actions whatsoever by the driver.

Advantageously, a sliding-lifting roof that can be swung out is used as a roof part that can be opened, and the first position corresponds to a completely slid-back cover position and the second position corresponds to a swung-out position of the cover.

As an alternative to this, the roof part that can be opened can also be advantageously formed from a power roof that can be lowered at its front edge as well as slid back, and the first position corresponds to a completely slid-back cover position and the second position corresponds to a lowered position of the cover.

In a simple embodiment, an interior setpoint temperature is manually adjustable on a setpoint value generator. As a result, every driver himself can perform a temperature preselection comfortable to him on the basis of his experience. The interior setpoint temperature can also be stored in a control device as a fixed value.

In a more comfortable variant, a value for the outside temperature is fed to the control device and as a function of this and, optionally, as a function of the interior temperature, the control device calculates the corresponding interior setpoint temperature.

The process according to the invention is suitably begun as a function of the driver's control action. For example, advantageously an operation of a central door lock system in an opening direction from a locked condition can be used as the control action. As a result, a time advantage for the cooling of the interior follows, since the driver starts the process already in operating the door lock. As an alternative to this, the control action can also correspond to a turn of the ignition key.

To support the ventilation action via the roof opening, it is advantageous if a ventilator is switched on simultaneously with the moving of the roof part into the first position.

In a motor vehicle equipped with electric window lift mechanisms, another increase of the ventilation action can be achieved in that, simultaneously with the moving of the roof part into the first position, at least one of the windows is moved into an at least partially open position.

In a motor vehicle equipped with an air conditioner, it is advantageous if, when the interior temperature exceeds the interior setpoint temperature, the air conditioner is simultaneously switched on. The cooling effect of an air conditioner is greatly supported by the process according to the invention. In using the process according to the invention the necessary cooling output of an air conditioner can be reduced.

It is further advantageous if a rain sensor is connected to another input of the control device, so that the moving of the roof part into at least the first position with a larger opening is suppressed.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
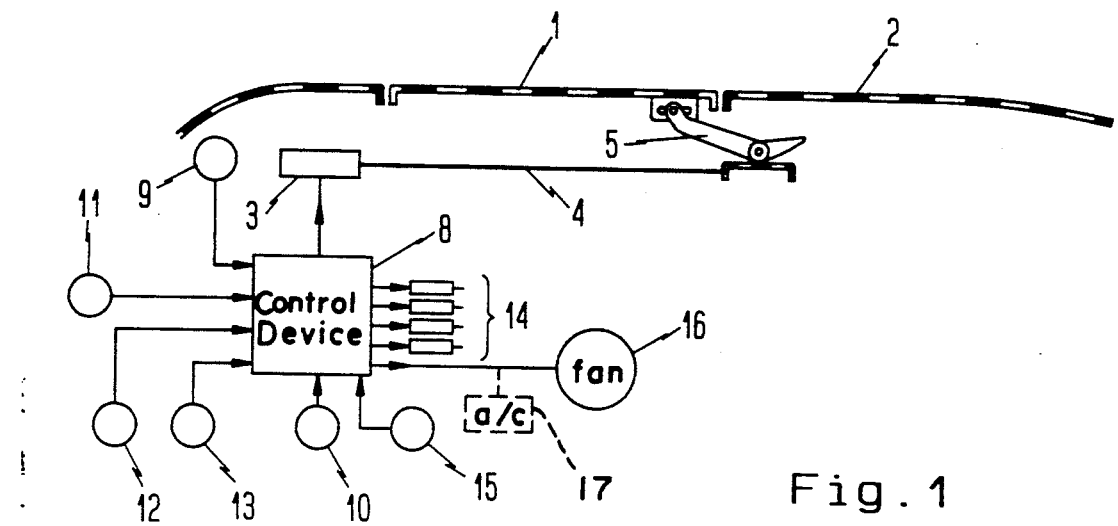
FIG. 1 is a diagrammatic representation of a sliding-lifting roof with the control components necessary for performing the process of the present invention.
Figure 2:
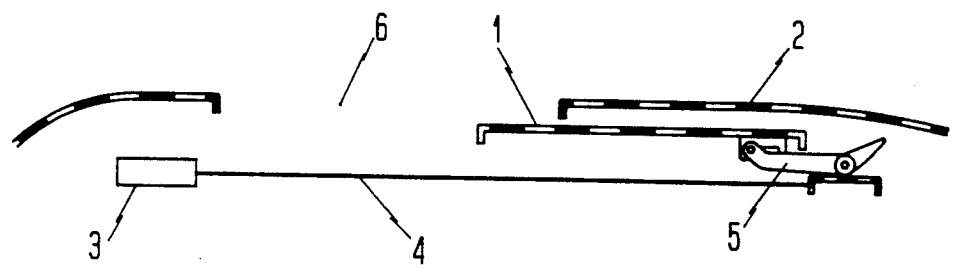
FIG. 2 is the sliding-lifting roof of FIG. 1 in a first open position.
Figure 3:
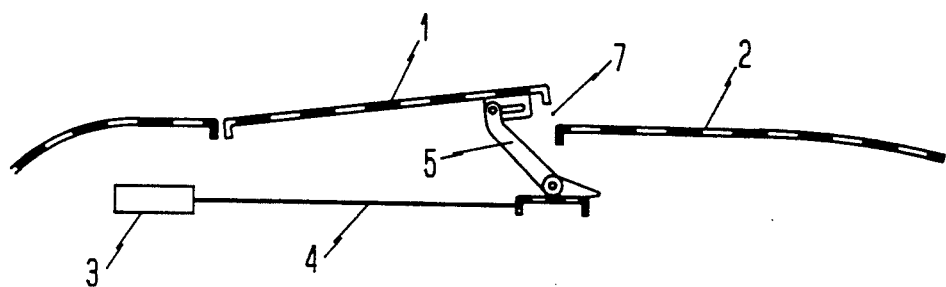
FIG. 3 is the sliding-lifting roof of FIG. 1 in a second, partially open position.

In FIG. 1, a roof of a motor vehicle is diagrammatically shown, and the permanent roof panel is designated with 2 and a roof part (cover) that can be opened is designated 1. Cover 1 is operated by an electric motor 3 by a drive cable 4 and a mechanism 5 hinged to the latter. It can be moved, in a known way via conventional means, from the closed position shown in FIG. 1, to a first position in which it opens, as shown in FIG. 2, a large roof opening 6. Cover 1, as shown in FIG. 3, can further be moved into a second position (swung-out position), in which it opens a smaller roof opening 7.

The position of the cover is achieved by a control device 8, represented in FIG. 1, which emits the corresponding setting pulses to electric motor 3.

An interior temperature sensor 9, a setpoint value generator 10 for the interior setpoint temperature, a rain sensor 11, an outside temperature sensor 12, a signal from ignition lock 13 as well as a signal from central door lock system 15 are connected to various inputs of control device 8.

In addition to electric motor 3 for the roof part 1 that can be opened, control device 8 controls window lift mechanisms 14 as well as a fan 16 with various other outputs.

A first method of operation according to a process of the invention will now be described with reference to FIG. 4. Start-up in process step S1 occurs as a result of either a-signal received by control device 8 operation of the central door lock system 15 or turning of the ignition key in ignition lock 13, causes an interior setpoint temperature ($TI_{sp}$), an interior temperature TI as well as a variable programmed in the control device called END (which characterizes a desired time span) to be read in a step S2. The value for interior temperature TI is supplied by interior temperature sensor 9. The presetting of $TI_{sp}$ takes place, in the FIG. 4 embodiment, by a setpoint value generator 10; but, in a simple variant, a preset fixed value can be stored in control device 8 (e.g., $TI_{sp}22°$ C.). The value of variable END is 60 seconds, for example.

In a following step S3, the interior temperature TI is compared with interior setpoint temperature $TI_{sp}$ and if it is not greater, the process is terminated in step S3. If the interior temperature is found to be greater than the set point temperature in step S3, the signal from rain sensor 11 is queried in a following step S4. If precipitation is signaled, the process is ended in step S4. An alternative to this is represented in broken lines and is described further below.

If no precipitation is signaled in step S4, the sliding-lifting roof is moved into the first open position (FIG. 2) in a process step S5. Simultaneously, a variable TIME is set to zero. In following step S6, the variable TIME is increased by 1. In step S7, it is determined whether the variable TIME has reached the preset value END. If this is not the case, the loop leads back to before process step S6. If variable TIME has assumed the value of variable END, the sliding-lifting roof is moved into its second open position (FIG. 3) in a step S8.

This process step S8 can also be started directly from step 4 as an alternative to ending the process when the existence of precipitation is indicated in step S4, as indicated in the path drawn in broken lines. After the moving of the sliding-lifting roof into the second open position, the process ends in step S9.

Figures 4, 5:
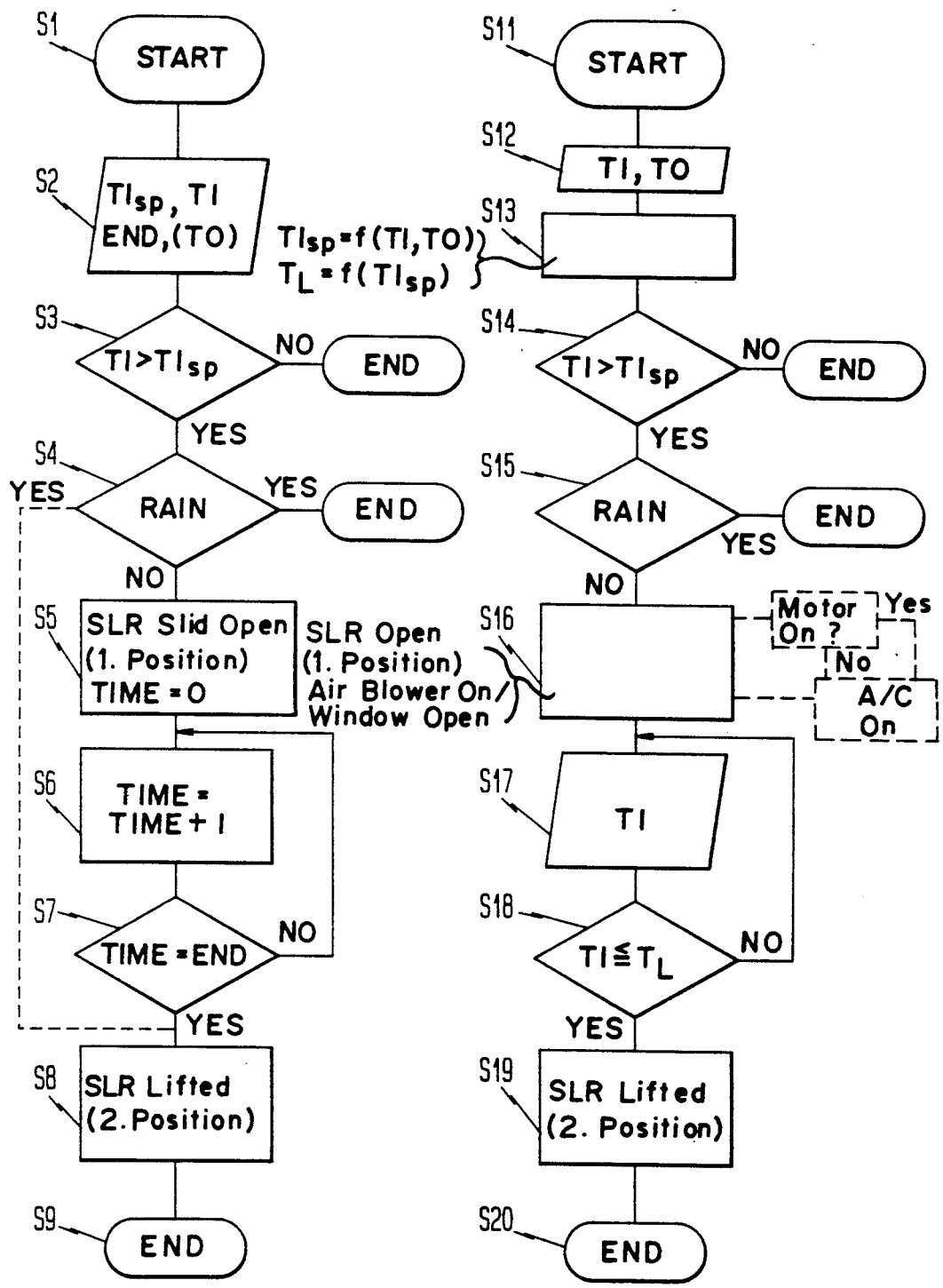
FIG. 4 is a flow chart for a time-dependent process for controlling movement of the sliding-lifting roof into the first and second positions.
FIG. 5 is a flow chart for a temperature-dependent process for controlling movement of the roof into the first and second positions.

In FIG. 5, another mode of operation according to the process of the invention is represented. Starting from the start-up in step S11, which, as already described in connection with FIG. 4, can be produced by a signal from the ignition or central door lock system 15, interior temperature TI and outside temperature TO are read in following step S12.

In step S13, control device 8 calculates an interior setpoint temperature $TI_{sp}$ as a function of interior temperature TI and outside temperature TO. Further in step S13, control device 8 calculates a lower threshold temperature $T_L$ as a function of interior setpoint temperature $TI_{sp}$.

In the simplest case in this connection, $T_L$ corresponds to the value of $TI_{sp}$, and then only a single temperature is used for the opening of the sliding-lifting roof and for the reversal in the lifting position. In an interior temperature TI only slightly above interior setpoint temperature $TI_{sp}$, a shifting of the cover to the first and the second positions would take place closely in succession, so that a lower threshold temperature is advantageous in every case.

In following step S14, it is determined whether interior temperature TI is greater than interior setpoint temperature $TI_{sp}$. If this is not the case, the process is ended in step S14.

If the determination in step S14 is answered positively, it is determined in next step S15 whether a signal from rain sensor 11 is present. If this is the case, the process is terminated in step S15. As an alternative to the termination in step S15, as in the above-described example of FIG. 4, the process can proceed to step S19 when precipitation is present.

If no precipitation is indicated in step S15, the sliding-lifting roof is moved, in step S16, into its first open position with large opening 6 (FIG. 2). Simultaneously, a ventilator 16 is turned on to support the ventilation action. As an alternative, power window lift mechanisms 14 can be actuated, in this step S16, to at least partially open at least one window.

In step S17, interior temperature TI is read again. In following step S18, it is determined whether interior temperature TI is smaller than or equal to lower threshold temperature $T_L$. As long as this is not the case, the path leads back to before process step S17. If this condition is met in step 18, the sliding-lifting roof is moved into its second position, in which a smaller roof opening 7 (FIG. 3) is opened in step S19. In step S20, the process is ended.

If the motor vehicle is equipped with electric window lift mechanisms 14, the latter are suitably moved into an at least partially open position in process step S5, or in the second example in process step S16, simultaneously with the moving of the sliding-lifting roof into the first position.

If the motor vehicle, in addition, has an air conditioner 17, after meeting the condition in step S3 in the first example, or step S14 in the second example, operation of the motor vehicle generator, and thus of the motor vehicle engine can be signalled, and if this condition also is met, the air conditioner of the motor vehicle can be switched on. The action of an air conditioner is substantially improved by the opening of the roof first taking place, optionally supported by the opening of the windows and the switching on of the ventilator, as represented by the broken line loop at step S16.

In the simplest embodiment, a sliding-lifting roof provided with a positional automatic control (switching logic) has to be supplemented only by a simple temperature sensor as well as by a value permanently stored for $TI_{sp}$ to meet the minimal requirements of the FIG. 5 process. Such a linkage can be produced at a reasonable price and can be already very effective in a greatly heated interior.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Process for cooling the interior of a motor vehicle with a roof part which is movable by an electric motor into or at least two positions opening roof openings of varying size, comprising the steps of:
   a) measuring an interior temperature with an interior temperature sensor and feeding a measurement signal to a first input of a control device;
   b) providing the control device with an interior setpoint temperature;
   c) moving the roof part into a first open position creating a large roof opening when the interior setpoint temperature is exceeded by the interior temperature measured; and
   d) subsequently automatically moving the roof part into a second open position creating a roof opening that is smaller than the large roof opening.

2. Process according to claim 1, wherein the step of automatically moving the roof part into the second open position is commenced after a preset time span.

3. Process according to claim 1, wherein a lower threshold temperature is calculated in the control device as a function of the interior setpoint temperature, and wherein the step of automatically moving the roof part into a second open position is commenced when the interior temperature measured falls below the lower threshold temperature calculated.

4. Process according to claim 3, wherein lower threshold temperature is set to be equal to interior setpoint temperature.

5. Process according to claim 3, wherein the roof part that can be opened is a sliding-lifting roof having a cover that can be slid rearward as well as be swung up at a rear edge; wherein the first position is a completely slid-back position of the cover; and wherein the second open position is a swung up position of the cover.

6. Process according to claim 3, wherein the roof part that can be opened is a power roof having a cover that can be slid rearward as well as lowered at a front edge; wherein the first open position is a completely slid-back position of the cover; and wherein the second open position is a lowered position of the cover.

7. Process according to claim 2, wherein the roof part that can be opened is a sliding-lifting roof having a cover that can be slid rearward as well as be swung up at a rear edge; wherein the first position is a completely slid-back position of the cover; and wherein the second open position is a swung up position of the cover.

8. Process according to claim 2, wherein the roof part that can be opened is a power roof having a cover that can be slid rearward as well as lowered at a front edge; wherein the first open position is a completely slid-back position of the cover; and wherein the second open position is a lowered position of the cover.

9. Process according to claim 1, further comprising the step of measuring the temperature outside of the vehicle and providing an outside temperature signal indicative thereof to the control device; and wherein the control device calculates the interior setpoint temperature as a function of the outside temperature measured.

10. Process according to claim 1, wherein start-up of the process is commenced as a function of control action of the driver.

11. Process according to claim 10, wherein the control action comprises operation of a central door lock system in an opening direction.

12. Process according to claim 10, wherein the control action comprises turning on of an ignition key.

13. Process according to claim 1, wherein a ventilator fan is switched on simultaneously with the moving of the roof part into the first open position.

14. Process according to claim 1, wherein, in a motor vehicle with electric window lift mechanisms, at least one of the windows is moved into an at least partially open position simultaneously with the moving of the roof part into the first open position.

15. Process according to claim 1, wherein in a motor vehicle with an air conditioner, the presence of a signal indicating that a vehicle motor is running is determined, and wherein the air conditioner is switched on when the interior setpoint temperature is exceeded by the interior temperature measured and it is determined that the vehicle engine is running.

16. Process according to claim 1, comprising the step of determining the presence of precipitation outside of the motor vehicle; and wherein at least the step of moving the roof part into the first position is suppressed when precipitation is determined to be present.

17. Vehicle roof system comprising a roof part that is movable by an electric motor from a closed position into at least two positions opening roof openings of varying size, an interior temperature sensor for measuring the temperature within a motor vehicle and producing an output signal indicative thereof, a control device having means for providing an interior setpoint temperature, an input for receiving the output signal from the interior temperature sensor and an output connected to the electric motor for controlling operation thereof; wherein control device includes means for determining when the interior temperature measured by the interior temperature sensor exceeds a predetermined interior setpoint temperature and for providing control signals to said electric motor which cause said motor to move the roof part to a first open position creating a large roof opening when the interior temperature indicated by the output signal from the interior temperature sensor exceeds the interior setpoint temperature and to, subsequently, automatically move the roof part into a second open position creating a roof opening that is smaller then the large roof opening.

18. Vehicle roof system according to claim 17, wherein said control device comprises a timer means for actuating movement of the roof part into said second open position a predetermined time span after the roof is moved into said first open position.

19. Vehicle roof system according to claim 17, further comprising an outside temperature sensor for measuring temperature outside of the motor vehicle and producing and output indicative thereof, the output of the outside temperature sensor being connected to additional input of the control device; wherein said control device includes means for determining the interior setpoint temperature as a function of the outside temperature indicated by the outside temperature sensor.

20. Vehicle roof system according to claim 18, wherein said control device further comprises means for calculating a lower threshold temperature as a function of the interior setpoint temperature, said control device being operative to produce the automatic movement of the roof part into the second open position when the interior temperature indicated by the inside temperature sensor falls below the lower threshold temperature.

21. Vehicle roof system according to claim 16, wherein the control device is provided with a manually adjustable setpoint value generator for setting the interior setpoint temperature.

22. Vehicle roof system according to claim 16, wherein the interior setpoint temperature is stored as a standard value in the control device.

23. Process according to claim 16, wherein a rain sensor is connected to another input of control device for signalling the presence of precipitation, said control device suppressing at least the moving of the roof part into the first position in response to receipt of a signal from said rain sensor.

* * * * *